United States Patent
Heitz et al.

(10) Patent No.: US 6,232,435 B1
(45) Date of Patent: May 15, 2001

(54) POLYALKYLENE ARYLATES CONTAINING A HIGH PROPORTION OF CARBOXYL END GROUPS

(75) Inventors: Thomas Heitz; Helmut Heel, both of Dannstadt-Schauernheim; Peter Braune, Erbes-Büdesheim; Martin Klatt, Mannheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/646,174

(22) PCT Filed: Mar. 25, 1999

(86) PCT No.: PCT/EP99/02029

§ 371 Date: Sep. 14, 2000

§ 102(e) Date: Sep. 14, 2000

(87) PCT Pub. No.: WO99/50333

PCT Pub. Date: Oct. 7, 1999

(30) Foreign Application Priority Data

Apr. 1, 1998 (DE) ............................................... 198 14 529

(51) Int. Cl.$^7$ ....................................................... C08F 6/00
(52) U.S. Cl. .......................... 528/491; 528/272; 528/308; 528/308.6; 528/503; 526/65
(58) Field of Search .................................. 528/272, 308, 528/308.6, 491, 503; 526/65

(56) References Cited

U.S. PATENT DOCUMENTS 4,056,514 * 11/1977 Strehler et al. .
4,238,593    12/1980 Duh ....................................... 528/272
4,374,975 *  2/1983 Duh ....................................... 528/272
4,680,376 *  7/1987 Heinze et al. ......................... 528/279
4,740,580    4/1988 Merck et al. .......................... 528/272
4,824,930 *  4/1989 Doerr .................................... 528/272
5,015,759 *  5/1991 Lowe ...................................... 560/91
5,235,027 *  8/1993 Thiele et al. ......................... 528/308.2
5,362,844 * 11/1994 Kerpes et al. ........................ 528/308.5
5,496,887    3/1996 Braune ................................... 524/777
5,854,377   12/1998 Braune ................................... 528/309
5,889,135    3/1999 Warzelhan et al. .................... 528/176

FOREIGN PATENT DOCUMENTS 25 14 116       9/1976 (DE) .
44 01 055 A1    7/1995 (DE) .
195 05 185 A1  10/1996 (DE) .
664 320         7/1995 (EP) .
879652         10/1961 (GB) .
2 184 129       9/1986 (GB) .
9-137084        5/1997 (JP) .
WO 96/28492     9/1996 (WO) .

* cited by examiner

Primary Examiner—Samuel A. Acquah
(74) Attorney, Agent, or Firm—Keil & Weinkauf

(57) ABSTRACT

A process for preparing polyalkylene arylates by esterifying or transesterifying an aromatic dicarboxylic acid or its esters or ester-forming derivatives with a molar excess of an aliphatic dihydroxy compound and polycondensing the resultant esterification or transesterification product comprises polycondensing the prepolymer with a viscosity number (VN) of <30 ml/g in the presence of an oxygen-containing gas.

5 Claims, No Drawings

POLYALKYLENE ARYLATES CONTAINING A HIGH PROPORTION OF CARBOXYL END GROUPS

The invention relates to an improved process for preparing polyalkylene arylates which have a high carboxyl end group content.

The invention also relates to the polyalkylene arylates obtainable by the novel process, and also to mixtures of these with polycarbonates and/or with polyamides, and to the use of molding compositions of this type for producing moldings, and the resultant moldings.

Processes for preparing polyesters are known, inter alia, from DE-A 25 14 116, EP-A 815 158 and GB-A 2 184 129. The starting materials, such as diols and acids and/or esters of these, are generally esterified or transesterified in the presence of catalysts, followed by one or more polycondensation steps under reduced or modified pressure. The polyesters obtained from most of the known processes have a low carboxyl end group content.

Polybutylene terephthalate, for example, has very low moisture absorption and high dimensional stability, together with good solvent resistance. A disadvantage, however, is its limited toughness, for example compared with polycarbonates or with polyamides.

Blends of these polymers with PBT have the combination of properties desired for a number of applications, where particular value is placed on good mechanical properties, such as, for example, high toughness.

In the prior art, high-molecular-weight polyester blends are prepared by a complicated compounding process, where the polyester is held above the melting point for long residence times and has to be mixed in this phase with the other component of the blend.

Adequate mixing of the blend components is a very important factor here. The formation of block copolymers, utilizing reactive groups on the polymer matrix, can improve phase compatibility.

When preparing a polyester blend of this type care must also be taken that the chemical properties of one polymer do not cause degradation of the other blend component.

In the prior art, polyester blends are prepared by mixing polymers using kneading machinery (single- or twin-shaft, co- or counter-rotating, intermeshing or non-intermeshing design). This additional process step causes thermal degradation of the polymer during melting and mixing.

For preparing a blend it would be desirable to use a polyester having a very high carboxyl end group content, thus promoting compatibilization via reactive coupling and very substantially preventing degradation of the other component of the blend.

It is an object of the present invention to provide a cost-effective process for obtaining polyalkylene arylates with a very high carboxyl end group content.

We have found that this object is achieved by means of a process for preparing polyalkylene arylates by esterifying or transesterifying an aromatic dicarboxylic acid or its esters or ester-forming derivatives with a molar excess of an aliphatic dihydroxy compound and polycondensing the resultant esterification or transesterification product, which comprises polycondensing the prepolymer with a viscosity number (VN) of <30 ml/g in the presence of an oxygen-containing gas.

Preferred embodiments are given in the subclaims.

We have also found that the polyalkylene arylates obtainable by the novel process, when combined with polycarbonates and/or with polyamides, give improved phase compatibility and therefore better mechanical properties. In addition, the molecular weight of the other component of the blend is very substantially unimpaired during the preparation.

Polyalkylene arylates are known per se and are described in the literature. Their main chain contains an aromatic ring which derives from the aromatic dicarboxylic acid. The aromatic ring may also be substituted, e.g. by halogen, such as chlorine and bromine, or by $C_1$–$C_4$-alkyl, such as methyl, ethyl, isopropyl, n-propyl, n-butyl, isobutyl or tert-butyl.

Preferred dicarboxylic acids which may be mentioned are 2,6-naphthalenedicarboxylic acid and terephthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Among the aliphatic dihydroxy compounds, preference is given to diols having from 2 to 6 carbon atoms, in particular 1,2-ethanediol, 1,3-propanediol, 1,4-butanediol, 1,6-hexanediol, 1,4-hexanediol, 5-methyl-1,5-pentanediol, 1,4-cyclohexanediol, 1,4-cyclohexanedimethanol and neopentylglycol, and mixtures of these.

Particularly preferred polyesters (A) which may be mentioned are polyalkylene terephthalates, which derive from alkanediols having from 2 to 10 carbon atoms, preferably from 2 to 6 carbon atoms. Among these, particular preference is given to polyethylene terephthlate and polybutylene terepthalate, and mixtures of these.

Other preferred polymers are polyethylene terephthalates and polybutylene terephthalates which contain, as other monomer units, up to 1% by weight, preferably up to 0.75% by weight, of 1,6-hexanediol and/or 5-methyl-1,5-pentanediol.

The preparation is preferably continuous and based on DE-A 44 01 055, by a) in a first step, esterifying or transesterifying an aromatic dicarboxylic acid or its esters or ester-forming derivatives, with a molar excess of a dihydroxy compound, b) in a second step, precondensing the transesterification or esterification product obtained in a), and c) in a third step, polycondensing the product obtainable from b) to the desired viscosity number, where steps a) and b) of the process are carried out in at least two temperature zones.

Step a) of the process is termed a transesterification or esterification reaction. This is carried out in at least two, and preferably at least three, temperature zones. The temperature here of each zone should be higher than that of the preceding zone by from 1 to 40° C., preferably from 2 to 30° C. and in particular from 5 to 10° C. The temperature range for the entire esterification reaction is generally (depending on the starting material) from 165 to 260° C., preferably from 170 to 250° C. and in particular from 180 to 240° C., and the pressure is generally from 1 to 10 bar, preferably from 1 to 4 bar and in particular from 1 to 2 bar.

Step a) of the process preferably operates in at least two temperature zones with very substantially identical pressure conditions in the individual zones. The technical requirements, such as apparatus (e.g. in the form of reactor cascades) for creating different temperature zones are known to the person skilled in the art, and therefore need not be described here in greater detail.

The starting materials, such as diols and acids, have already been described above.

The reaction is usually carried out with a molar excess of diol, in order to exert the desired influence on the ester equilibrium. The molar ratios of dicarboxylic acid and/or dicarboxylic ester to diol are usually from 1:1.1 to 1:3.5, preferably from 1:1.2 to 1:2.2. It is very particularly preferable for the molar ratios of dicarboxylic acid to diol to be from 1:1.5 to 1:2, and of diester to diol to be 1:1.25 to 1:1.5.

However, it is also possible to carry out the ester reaction with a small excess of diol in the first zone and correspondingly to add further amounts of diol in the other temperature zones. In the preferred embodiment of the novel process with three temperature zones, the entire amount of diol is divided over 3 zones in the following percentages: from 60 to 85 (1), from 10 to 25 (2) and from 5 to 15 (3), and preferably from 70 to 80 (1), from 10 to 20 (2), and from 5 to 10 (3).

The residence times for the entire step a) are from 140 to 300 min, preferably from 150 to 260 min and in particular from 160 to 220 min, and the residence time for the first zone is from 100 to 190 min, preferably from 110 to 150 min, and for the second zone from 65 to 140 min, preferably from 65 to 110 min. For the preferred embodiment with three zones, the residence time in the 3rd zone is from 15 to 45 min, preferably from 15 to 30 min, with the residence times in the 2nd zone correspondingly being reduced and those in the 1st zone being retained as described above.

In the preferred embodiment of the novel process, the residence times preferably decrease from the first to the third zone preferably in a ratio of 6:3:1.

In a particularly preferred embodiment, a catalyst and then an alkali metal compound or alkaline earth metal compound are firstly added to the dihydroxy compound, prior to step a) of the process.

Preferred catalysts are titanium compounds and tin compounds, as disclosed inter alia in U.S. Pat. Nos. 3,936,421 and 4,329,444. Preferred compounds which may be mentioned are tetrabutyl orthotitanate and triisopropyl titanate, and also tin dioctoate, which are usually used in step a) in amounts of from 20 to 150 ppm, preferably from 20 to 120 ppm and in particular from 30 to 70 ppm (based on the metal).

To reduce further the carboxyl end group content of the polyester it can be advantageous, before reacting the starting monomers, to add from 0.1 to 10 mmol, preferably from 0.2 to 0.65 mmol, of an alkali metal compound or alkaline earth metal compound (calculated as alkali metal or alkaline earth metal) per kg of polyester. Compounds of this type are proposed in DE-A 43 33 930. Preferred compounds which may be mentioned are sodium carbonate, sodium acetate and sodium alcoholates, in particular sodium methanolate.

The transesterification or esterification products are then transferred continuously to the precondensation step b).

This has at least two temperature zones, preferably at least three and in particular at least four. The temperature of each zone here is higher than that of the preceding zone by from 1 to 40° C., preferably from 2 to 30° C. and in particular from 5 to 20° C. The temperature range for the entire precondensation is generally (depending on the starting materials) from 220 to 300° C., preferably from 225 to 290° C. and in particular from 240 to 290° C.

The precondensation is preferably carried out with a pressure in the first zone of from 0.5 to 1 bar, preferably from 0.6 to 0.8 bar, and in the second or last zone from 20 to 200 mbar, preferably from 25 to 150 mbar and in particular from 50 to 150 mbar. An example of a reactor which can be used industrially for this purpose is a vertical tube-bundle reactor, and other reactors for the purpose are known to the person skilled in the art.

The residence times for the entire step b) of the process are from 10 to 80 min, preferably from 15 to 50 min and in particular from 20 to 40 min.

In a particularly preferred embodiment of the novel process, use is made of four temperature zones. The relationships of temperature rising from zone to zone are as described above, and the pressure is reduced from the first to the fourth zone within the limits described. In this embodiment of the tube-bundle heat exchanger, the fourth zone is composed of equipment for separating liquid and vapor phase (also termed a vapor separator). The ratio of the volume of the vapor separator to the volume in the tubes is preferably from 5 to 15:1, in particular from 8 to 13:1.

The volume ratios of the first three zones in this particularly preferred embodiment are preferably designed in such a way that the volume made up by the first zone is from 30 to 60%, preferably 50%, and that made up by the second zone is from 20 to 40%, preferably 30%, and that made up by the third zone is from 10 to 30%, preferably 20%. The temperature ranges, pressure ranges and residence times for the particularly preferred embodiment of the novel process are listed below:

1st zone: From 230 to 270° C., preferably from 240 to 250° C., and pressure from 0.6 to 0.9 bar, preferably from 0.7 to 0.9 bar.

Residence time from 10 to 30 min, preferably from 15 to 25 min.

2nd zone: From 240 to 280° C., preferably from 250 to 270° C., and pressure from 0.2 to 0.6 bar, preferably from 0.3 to 0.5 bar.

Residence time from 5 to 25 min, preferably from 7 to 15 min.

3rd zone: From 245 to 290° C., preferably from 250 to 280° C., and pressure from 0.1 to 0.3 bar, preferably from 0.1 to 0.25 bar.

Residence time from 5 to 10 min, preferably from 4 to 8 min.

4th zone: from 250 to 300° C., preferably from 252 to 285° C., and pressure from 0.015 to 0.2 bar, preferably from 0.025 to 0.15 bar.

Residence time from 10 to 30 min, preferably from 14 to 24 min.

The catalysts mentioned above for step a) of the process, and other additives, may be metered into step b) of the process in the amounts mentioned.

After step b) of the novel process, the polyester prepolymer has a viscosity number <30 ml/g, preferably from 20 to 30 ml/g, measured on a 0.5% strength by weight solution in phenol/o-dichlorobenzene (1:1) in accordance with DIN 53728 Part 3 (1985) at 25° C.

The polyester prepolymer is then transferred to step c) of the novel process. This is preferably carried out in a single step at from 240 to 290° C., preferably from 240 to 270° C. and in particular from 240 to 265° C. The pressure is from 0.3 to 10 mbar, preferably from 0.3 to 5 mbar and in particular from 0.3 to 2 mbar.

The residence times are usually from 30 to 180 min, preferably from 35 to 150 min.

During the polycondensation, the surface of the product may preferably be refreshed. Surface refreshment is the continuous arrival of fresh polymer at the surface of the melt, facilitating the escape of the diol.

This is preferably from 1 to 20 $m^2$/kg of product and minute, and in particular from 1.5 to 6 $m^2$/kg of product and minute.

It may moreover be advantageous for addition of catalysts and other additives, as described above, to continue in this step of the process.

An important feature of the novel process is that the polycondensation of the prepolymer is carried out in the presence of an oxygen-containing gas. To achieve a high carboxyl end group content, these gases should comprise at least 17% by volume of oxygen, preferably at least 18% by volume of oxygen. Use is preferably made of oxygen and air.

To improve dispersion, the prepolymer may be comminuted, e.g. ground, and then stirred for a period of from 30 min to 15 hours, preferably from 50 min to 6 hours, with, for example, air at room temperature. The polycondensation is then carried out using the abovementioned process conditions, with the pressure preferably reduced in a number of stages, as described above for step c).

After the continuous polycondensation the polyester has a viscosity number of from 60 to 180 ml/g, preferably from 90 to 160 ml/g, determined at 25° C. in a 0.5% strength by weight solution in a phenol/o-dichlorobenzene mixture (weight ratio 1:1) in accordance with DIN 53728, Part 3 (1985).

The carboxyl end group content after the polycondensation is at least 30%, preferably at least 40% and in particular at least 50%, based on the total of carboxyl and OH end groups of the polymer. The carboxyl end group content is usually determined by a titration method (e.g. potentiometry). The polyalkylene arylates obtainable by the novel process are suitable for producing moldings of any type. They are particularly suitable for thermoplastic molding compositions comprising A) from 10 to 100% by weight, preferably from 10 to 95% by weight, of a polyalkylene arylate as claimed in claim 6, B) from 0 to 90% by weight, preferably from 5 to 80% by weight, of a polycarbonate or of a polyamide or mixtures of these, and C) from 0 to 50% by weight, preferably from 0 to 30% by weight, of other additives, where the total of the percentages by weight of components A) to C) is 100%.

The structure of the polyalkylene arylates A) has already been described above. Suitable polycarbonates B) can be obtained by polymerizing aromatic dihydroxy compounds, in particular 2,2-bis(4-hydroxyphenyl)propane (bisphenol A) or its derivatives, for example with phosgene. Corresponding products are known per se and are described in the literature, and many of them are also available commercially. The amount of the polycarbonates is up to 90% by weight, preferably up to 50% by weight, based on 100% by weight of components A) to C).

The polyamides of the novel molding compositions generally have a viscosity number of from 90 to 350 ml/g, preferably from 110 to 240 ml/g, determined at 25° C. in a 0.5% strength by weight solution in 96% strength by weight sulfuric acid in accordance with ISO 307.

Preference is given to semicrystalline or amorphous resins with a molecular weight (weight average) of at least 5000, as described, for example, in U.S. Pat. Nos. 2,071,250, 2,071,251, 2,130,523, 2,130,948, 2,241,322, 2,312,966, 2,512,606 and 3,393,210.

Examples of these are polyamides derived from lactams having from 7 to 13 ring members, for example polycaprolactam, polycapryllactam and polylaurolactam, and also polyamides which are obtained by reacting dicarboxylic acids with diamines.

Dicarboxylic acids which can be used are alkanedicarboxylic acids having from 6 to 12 carbon atoms, in particular from 6 to 10 carbon atoms, and aromatic dicarboxylic acids. A few examples which may be mentioned are adipic acid, azelaic acid, sebacic acid, dodecanedioc acid, terephthalic acid and isophthalic acid.

Particularly suitable diamines are alkanediamines having from 6 to 12 carbon atoms, in particular from 6 to 8 carbon atoms, and also m-xylylenediamine, di(4-aminophenyl) methane, di(4-aminocyclohexyl)methane, 2,2-di(4-aminophenyl)propane or 2,2-di(4-aminocyclohexyl) propane.

Preferred polyamides are polyhexamethyleneadipamide, polyhexamethylenesebacamide and polycaprolactam and also nylon-6/66, in particular with a proportion of from 5 to 95% by weight of caprolactam units.

Mention may also be made of polyamides obtainable, for example, by condensing 1,4-diaminobutane with adipic acid at elevated temperature (nylon-4,6). Processes for preparing polyamides of this structure are described, for example, in EP-A 38 094, EP-A 38 582 and EP-A 39 524.

Other suitable polyamides are those obtainable by copolymerizing two or more of the abovementioned monomers or mixtures of more than one polyamide in any desired ratio.

Other polyamides which have also proven advantageous are partly aromatic copolyamides, such as nylon-6/6,T and nylon-6,6/6,T with a triamine content of less than 0.5% by weight, preferably less than 0.3% by weight (see EP-A 299 444).

The preferred partly aromatic copolyamides with a low triamine content may be prepared by the processes described in EP-A 129 195 and 129 196.

The novel molding compositions may comprise, as component C), up to 50% by weight, in particular not more than 40% by weight, of other additives.

The novel molding compositions may comprise, as component C), from 1 to 50% by weight, preferably from 5 to 40% by weight and in particular from 10 to 30% by weight, of a filler.

Preferred fibrous fillers which may be mentioned are carbon fibers, aramid fibers and potassium titanate fibers, and glass fibers in the form of E glass are particularly preferred. These may be used as rovings or as chopped glass in the forms commercially available.

The fibrous fillers may have been surface-pretreated with a silane compound to improve compatibility with the thermoplastics.

Acicular mineral fillers are also suitable.

For the purposes of the invention, acicular mineral fillers are mineral fillers with strongly developed acicular character. An example which may be mentioned is acicular wollastonite. The mineral preferably has a L/D (length/diameter) ratio of from 8:1 to 35:1, preferably from 8:1 to 11:1. The mineral filler may, if desired, have been pretreated with the abovementioned silane compounds, but the pretreatment is not essential.

Other fillers which may be mentioned are kaolin, calcined kaolin, wollastonite, talc and chalk.

Other additives and processing aids which may be mentioned are amounts of from 0 to 2% by weight of fluorine-containing ethylene polymers. These are polymers of ethylene with a fluorine content of from 55 to 76% by weight, preferably from 70 to 76% by weight.

Examples of these are polytetrafluoroethylene (PTFE), tetrafluoroethylene copolymers or tetrafluoroethylene copolymers with relatively small proportions (generally up to 50% by weight) of copolymerizable ethylenically unsaturated monomers. These are described, for example, by Schildknecht in Vinyl and Related Polymers, Wiley-Verlag, 1952, pages 484 to 494, and by Wall in "Fluorpolymers" (Wiley Interscience, 1972).

These fluorine-containing ethylene polymers are present in homogeneously distributed form in the molding compositions and preferably have a particle size $d_{50}$ (numerical median) in the range from 0.05 to 10 μm, in particular from 0.1 to 5 μm. These small particle sizes are particularly preferably achieved by using aqueous dispersions of fluorine-containing ethylene polymers and incorporating these, for example, into a polyester melt.

Impact modifiers may be mentioned as additives and are also termed elastomeric polymers or elastomers, and may be present in amounts of up to 20% by weight, preferably up to 15% by weight.

Conventional rubbers are suitable, e.g. ethylene copolymers with reactive groups, acrylate rubber and polymers of conjugated dienes, for example polybutadiene rubber and polyisoprene rubber. The diene polymers may have been hydrogenated to some extent or fully, in a manner known per se. Other examples of possible impact modifiers are hydrogenated styrene butadiene rubber, ethylene-propylene-diene rubber, polybutylene rubbers and polyoctenamer rubbers, ionomers, block copolymers made from vinyl aromatic monomers with dienes, such as butadiene or isoprene (known per se from EP-A 62 282) with the structure $M^1M^2$-, $M^1M^2M^1M^2$- or $M^1M^2M^1$-, where these block polymers may also contain segments with random distribution, and also star-block copolymers. Polymers which have proven particularly suitable are those of conjugated dienes, for example polybutadiene rubber or polyisoprene rubber. Synthetic rubbers of this type are familiar to the person skilled in the art and are reviewed in Ullmanns Encyklopädie der Technischen Chemie, 4th edition, Vol. 13, pages 595–634, Verlag Chemie GmbH, Weinheim 1977.

Other additives which may be mentioned are the usual amounts of heat and light stabilizers, lubricants, mold-release agents and colorants, such as dyes and pigments.

Mention may also be made of esters or amides made from at least one alcohol or amine having at least three functional groups and one or more mono- or dicarboxylic acids having from 5 to 34 carbon atoms, preference being given to pentaerythritol tetrastearate, and salts of Mg, Ca or Zn with carboxylic acids having up to 34 carbon atoms, in particular calcium stearate.

Suitable flame retardants which may be mentioned are halogen-containing and halogen-free flame retardants, such as melamine cyanurate, magnesium carbonates and/or phosphorus, which may be present in amounts of up to 15% by weight.

The properties of the end products can be controlled as desired to a large extent via the type and amount of the additives used.

The novel molding compositions may be prepared by processes known per se. In a preferred embodiment they are prepared by adding components B) and C) to the melt of component A).

For this purpose it is expedient to use extruders, e.g. single-screw or twin-screw extruders, or other conventional plastifying equipment, such as Brabender mixers or Banbury mixers.

The novel molding compositions have improved mechanical properties. They are therefore suitable for producing moldings of any type. Applications in the electrical industry are preferred.

EXAMPLES

1. Preparation of the Prepolymer (P1)

1 mol of DMT, 1.3 mol of 1,4-butanediol, $0.5*10^{-3}$ mol of tetrabutylorthotitanate and $7.7*10^{-5}$ mol of sodium methanolate per hour were reacted continuously in a system from which prepolymer was removed after the precondensation reaction. The temperature in the first reaction zone was 175° C., with a pressure of 1.03 bar and an average residence time of 184 min.

The temperature in the second reaction zone was 195° C. with a pressure of 1.03 bar and an average residence time of 65 min. The temperature in the third reaction zone was 203° C. with a pressure of 1.04 bar and an average residence time of 40 min.

The distillates produced here, which comprised BDO, DMT, THF and water, were separated in a column system, and DMT and BDO were reintroduced to the reaction.

With a conversion of 94% the transesterification product was fed to a vertical tube divided into 4 heating zones.

The temperature in the fourth reaction zone was 242° C. with a pressure of 700 mbar and an average residence time of 22 min.

The temperature in the fifth reaction zone was 246° C. with a pressure of 400 mbar and an average residence time of 12 min.

The temperature in the sixth reaction zone was 248° C. with a pressure of 150 mbar and an average residence time of 6 min.

The temperature in the seventh reaction zone was 247° C. with a pressure of 50 mbar and an average residence time of 18 min.

The precondensate had a VN of 26 ml/g, a hydroxyl end group content (HEC) of 463 meq/kg and a carboxyl end group content (CEC) of 12 meq/kg. The precondensate was ground and, without further catalyst addition, transferred to a polycondensation reactor.

2. Preparation of the Prepolymer (P2)

1 mol of DMT, 1.4 mol of 1,4-butanediol, $0.5*10^{-3}$ mol of tetrabutylorthotitanate and $7.7*10^{-5}$ mol of sodium methanolate per hour were reacted continuously in a system from which a prepolymer was removed after running the precondensation reaction.

The temperature in the first reaction zone was 165° C., with a pressure of 1.03 bar and an average residence time of 184 min.

The temperature in the second reaction zone was 175° C. with a pressure of 1.03 bar and an average residence time of 65 min.

The temperature in the third reaction zone was 205° C. with a pressure of 1.04 bar and an average residence time of 40 min.

The distillates produced here, which comprised BDO, DMT, THF and water, were separated in a column system. DMT and BDO were reintroduced to the reaction.

With a conversion of 96% the transesterification product was fed to a vertical tube divided into 4 heating zones.

The temperature in the fourth reaction zone was 242° C. with a pressure of 700 mbar and an average residence time of 22 min.

The temperature in the fifth reaction zone was 246° C. with a pressure of 400 mbar and an average residence time of 12 min.

The temperature in the sixth reaction zone was 248° C. with a pressure of 150 mbar and an average residence time of 6 min.

The temperature in the seventh reaction zone was 247° C. with a pressure of 50 mbar and an average residence time of 18 min.

The precondensate had a VN of 29 ml/g, a hydroxyl end group content (HEC) of 545 meq/kg and a carboxyl end group content (CEC) of 10 meq/kg.

The precondensate was ground and, without further catalyst addition, transferred to a polycondensation reactor.

3. Polycondensation with Air

The pulverized prepolymer (P1 and P2, respectively) was transferred into a 1 l polycondensation reactor with anchor stirrer and then aerated (10 l/h) overnight at 23° C.

Melting (234° C. internal temperature) was followed by evacuation of the reactor in six stages (750, 500, 250, 100, 50 mbar, 1 mbar), and the contents were polycondensed with stirring (30 rpm, and finally 15 rpm) at 250° C. After achievement of maximum viscosity (160 min), the vacuum was released and the product removed.

The resultant product had the following makeup

| Product | Prepolymer | CEC meq/kg | HEC meq/kg | VN ml/g |
|---|---|---|---|---|
| A1 | P1 | 73 | 19 | 92 |
| A2 | P2 | 47 | 13 | 130 |

4. COMPARATIVE EXAMPLE

Polycondensation Under Nitrogen

The experiment was carried out as described in Example 1, but after the pulverized prepolymer (AC1 and AC2, respectively) had been transferred into the polycondensation reactor it was inertized with nitrogen (10 l/h) at 23° C. overnight.

The polycondensation was carried out in a similar manner, but no gas was introduced during the condensation and the final pressure achieved was 0.4 mbar.

After 160 min, the vacuum was released and the product removed.

The comparative products obtained had the following makeup:

| Product | Prepolymer | CEC meq/kg | HEC meq/kg | VN ml/g |
|---|---|---|---|---|
| AC1 | P1 | 39 | 46 | 95 |
| AC2 | P2 | 30 | 36 | 122 |

5. Processing to Give Molding Compositions

The polymers obtained from the examples (A1 and A2) and also from the comparative examples (AC1 and AC2) were mixed with polycarbonate made from bisphenol A with a VN of 64 ml/g (Lexan® 61 from GEP) in a twin-screw extruder (ZSK 30, 200 rpm, 10 kg/h throughput and 250° C.). The formulation comprised 50% of polycarbonate. The mechanical properties were determined in accordance with the ISO standards given below.

| | | | | |
|---|---|---|---|---|
| Polymer A1 | 50 | | | |
| Polymer A2 | | 50 | | |
| Comparative polymer AC1 | | | 50 | |
| Comparative polymer AC2 | | | | 50 |
| Polycarbonate | 50 | 50 | 50 | 50 |
| VN (Blend) | 75 | 88 | 71 | 81 |
| VN of the PC phase (Extract in $CH_2Cl_2$) | 45 | 41 | 43 | 40 |
| MFR 250° C., 10 kg (ml/10 min) | 98.2 | 69.1 | 85.7 | 56.1 |
| MFR 270° C., 2.16 kg (ml/10 min) | 33.6 | 24.3 | 23.7 | 15.2 |
| Modulus of elasticity (ISO 527) MPa | 2530 | 2480 | 22170 | 2120 |
| Charpy (ISO 179 leU) $kJ/m^2$ | 261 | 304 | 225 | 269 |
| Charpy (ISO 179 leU) $kJ/m^2$ | 5.3 | 6.5 | 4.7 | 5.8 |

The VN was measured at 25° C. on a 0.5% strength solution of the polymer in a 1:1 mixture of phenol and o-dichlorobenzene. The VN of the PC extract was measured in $CH_2Cl_2$ at 23° C.

The carboxyl end group (CEC) content was determined by potentiometric titration of the acetic acid liberated when a specimen of the polymer was dissolved in nitrobenzene and reacted with a defined excess of potassium acetate.

We claim:

1. A process for preparing polyalkylene arylates by esterifying or transesterifying an aromatic dicarboxylic acid or its esters or ester-forming derivatives with a molar excess of an aliphatic dihydroxy compound and polycondensing the resultant esterification or transesterification product, which comprises polycondensing the prepolymer with a viscosity number (VN) of <30 ml/g in the presence of an oxygen-containing gas.

2. A process as claimed in claim 1, wherein the polyalkylene arylate has a viscosity number (VN) of at least 60 ml/g after the polycondensation.

3. A process as claimed in claim 1, wherein the oxygen-containing gas used comprises at least 17% by volume of oxygen.

4. A process as claimed in claim 1 wherein the oxygen-containing gas used is air.

5. A process as claimed in claim 1, wherein a polyalkylene terephthalate is used.

* * * * *